Feb. 26, 1924.

J. A. TARKINGTON ET AL 1,484,851

OILING SYSTEM

Filed May 14, 1919    2 Sheets-Sheet 1

INVENTORS.
Joseph A. Tarkington.
Herman D. Palmer.
By Miller, Chindahl & Parker
ATTORNEYS.

Feb. 26, 1924.

J. A. TARKINGTON ET AL 1,484,851

OILING SYSTEM

Filed May 14, 1919

2 Sheets-Sheet 2

INVENTORS.
Joseph A. Tarkington
Herman D. Palmer
ATTORNEYS.

Patented Feb. 26, 1924.

1,484,851

UNITED STATES PATENT OFFICE.

JOSEPH A. TARKINGTON AND HERMAN D. PALMER, OF HARTFORD, WISCONSIN, ASSIGNORS TO KISSEL MOTOR CAR COMPANY, OF HARTFORD, WISCONSIN, A CORPORATION OF WISCONSIN.

OILING SYSTEM.

Application filed May 14, 1919. Serial No. 297,079.

*To all whom it may concern:*

Be it known that we, JOSEPH A. TARKINGTON and HERMAN D. PALMER, citizens of the United States, residing at Hartford, in the county of Washington and State of Wisconsin, have invented certain new and useful Improvements in Oiling Systems, of which the following is a specification.

Our invention relates to oiling systems for power plants, and more specifically to oiling systems for internal combustion engines of the type used in motor vehicles, boats and aircraft. The load on such power plants varies over a wide range changing rapidly from the maximum load condition to mere idling and back again repeatedly according to road conditions, etc. The heaviest piston pressures are also apt to occur at relatively low speeds, as when the throttle is thrown wide open to pick up speed while climbing a hill. Under such conditions as these the usual oil pump driven from the engine either fails to supply the engine enough oil when the load is heavy and the speed low, or if designed for ample lubrication under such conditions, supplies too much oil at higher speeds and lighter loads, fouling the cylinders and spark plugs.

One object of our invention is to provide an oiling system remedying these defects and providing at all times a supply of lubricant proportional to the requirements of the engine at any given instant.

Another object is to accomplish such regulation without necessitating a reconstruction or adaptation of the entire power plant to the oiling system.

A special object is to provide for automatically timing the change in the supply of lubricant to take effect a trifle before the change in loading occurs, this automatic feature being inherent in the structure of the device.

Still another object is to accomplish the regulation in a simple way requiring only a small number of parts, not likely to break, stick, or get out of order under actual service conditions.

Further objects and advantages of the invention will appear as the description proceeds.

Figure 1:
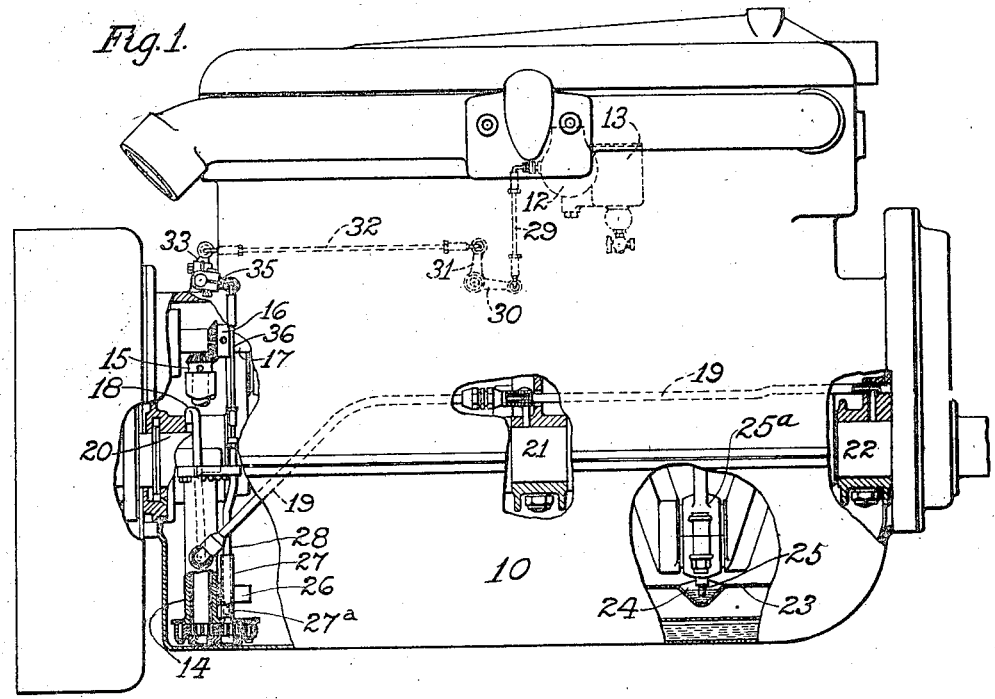
Figure 2:
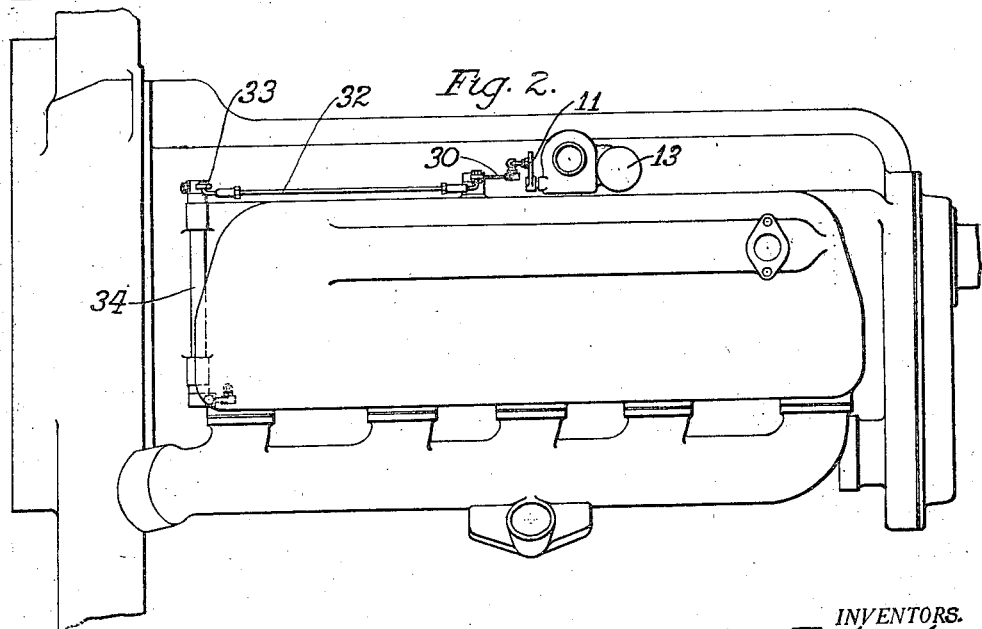
Figure 3:
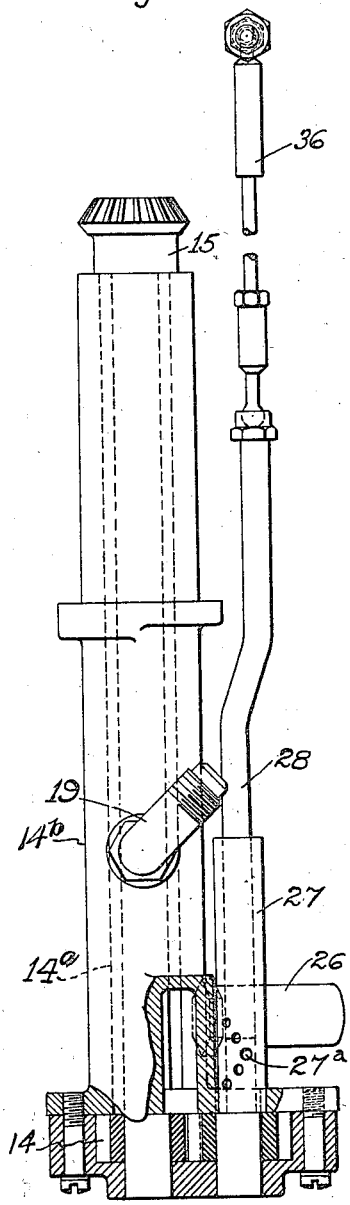
Figure 4:
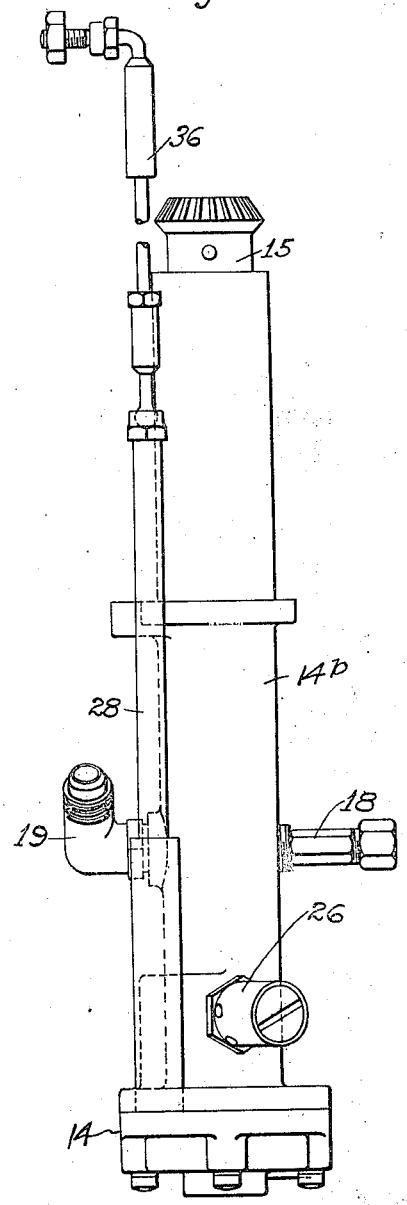

In the accompanying drawings, Figure 1 is a side elevation of an internal combustion engine with parts of the casing broken away showing the application of our improved oiling system thereto. Fig. 2 is a plan view of Fig. 1. Fig. 3 is a side and Fig. 4 a front elevation of the oil pump and the regulating by-pass therefor.

In the drawings 10 designates the casing of an ordinary internal combustion engine, having a carburetor 13 and a throttle 12 controlled by the throttle lever 11. The lubricating system comprises an oil pump 14, illustrated as a gear pump driven by a downwardly extending shaft $14^a$ suitably driven by bevel gears 15 and 16 from a secondary shaft 17. The pump discharges into a tubular casing $14^b$ which encloses the drive shaft $14^a$. From the casing $14^b$, suitable oil conduits 18 and 19 lead to the crank shaft bearings. In the engine illustrated there are three main crank shaft bearings 20, 21 and 22. Conduit 18 supplies oil to the rear bearing 20, and conduit 19 supplies the center bearing 21 and the front bearing 22. Spaced from the bottom of the casing 10 is a splash pan 23, having depressions 24, one located under each cylinder. A finger 25 on the connecting rod $25^a$ sweeps through depression 24 at each revolution of the engine.

When the engine is running, the oil supplied to the main bearings by the pump overflows continuously and falls into the splash pan 23, filling the depressions 24 with oil, which is splashed by fingers 25 and the connecting rods and crank cheeks moving with the finger, onto all parts of the engine, thus lubricating the connecting rod bearings and cylinder walls.

The parts enumerated above make up a common type of internal combustion engine. For the purpose of the present invention, the oil pump, the engine, carburetor, splash pan, etc., may be of any desired design or type.

The oil pump is equipped with an emergency relief valve 26 of suitable construction connected to the casing 14ᵇ, and with a specially-constructed by-pass tube 27. This tube 27 contains a series of small holes 27ᵃ vertically spaced from one another. As shown there are five holes of equal size, equally spaced, but the number, size, and spacing of said holes may be varied at will to suit the requirements of any particular design. The variation in effective by-pass opening may easily be made practically continuous by a proper spacing of the apertures. A by-pass rod or valve 28 slides freely in tube 27 and is adapted by its rise or fall to open or close all the holes in tube 27 successively. Suitable mechanical connections between the rod 28 and the throttle lever 11, operate to move the rod and lever simultaneously from a closed throttle position with the rod above all the holes, to a wide open throttle position with the rod closing all the holes. As shown, these connections consist of a vertically extending rod 29 connected by ball and socket joints at its upper end to the throttle lever 11 and at its lower end to one arm 30 of a bell crank lever. A horizontal rearwardly extending rod 32 is similarly connected to the other arm 31 of said lever and to crank arm 33 on a transverse rock shaft 34. Crank arm 35 on the other end of said rock shaft is located directly over the oil pump 14 and through connecting rod 36 actuates the by-pass rod 28.

It will be seen that the tendency of the pump to deliver too much oil at high speeds and too little at low speeds may be counteracted and offset to any desired degree by the proper designing of the by-pass tube 27. With the throttle closed, or nearly so, and the engine turning idly at a moderately high speed most of the oil passing through the pump will escape back into the oil reservoir through the by-pass holes 27ᵃ and a relatively small amount will be fed to the moving parts. With the engine turning at the same speed, but driving the vehicle at, say, 30 miles an hour, the throttle will be half-way open and the same pump will supply a much larger amount of oil to the engine.

When the car is climbing a steep grade the piston loads are extreme and the speed only moderate. With the throttle wide open on a hill all the oil fed by the pump will reach the bearings.

Lastly, at very high vehicle speeds the throttle will also be wide open. Under these exacting power requirements all of the available oil supply of the pump, which is also operating at high speed, will be delivered to the engine bearings.

It should be noted that when the throttle is thrown open, the descending rod 28 will act as a piston as well as a valve, adding momentarily to the higher pressure that the gear pump will maintain after the apertures are closed. The increase in oil flow into the main bearings is practically instantaneous, and the resulting flood of oil will in a properly designed system reach the main bearings simultaneously with or a trifle before the first heavy impact resulting from the increased charge admitted to the cylinders. After a few turns of the engine the heavy overflow from the bearings will have raised the level of the oil in the splash pan, and the cylinder walls and connecting rod bearings will also be more freely oiled.

The lubricating system shown is employed in connection with a splash pan 23 spaced above the bottom of the oil reservoir. The overflow from the main bearings continually drains off the splash pan and falls back into the reservoir below the pan. The supply of oil for the splash lubrication is therefore greater when the overflow from the main bearings is increased, whereas if the splash lubrication took oil directly from the main body of oil, it would be decreased because the oil level would be lowered on account of the increased thickness of the film of oil flowing down over the parts from the bearings back to the reservoir.

While we have shown and described our improved oiling system as applied to an internal combustion engine for motor vehicles, it should be understood that the invention is useful in connection with any power plant or mechanical transmission connected thereto, where oil is fed by power to the moving parts; and is peculiarly advantageous wherever the load conditions are variable and where, for maximum efficiency, variations in loading should be accompanied by variations in the amount of oil supplied.

We claim as our invention:—

1. A power plant having, in combination, a reservoir of lubricant, a pump supplying lubricant from said reservoir, a conduit carrying oil from said pump to the parts to be lubricated, a tube separate from said conduit and mounted on and connected to said pump and having an open end and a plurality of lateral apertures, and a rod entering the open end of said tube and adapted to slide therein.

2. In a device of the class described, in combination, a gear pump having a casing, two tubes extending upward from said casing and adapted to receive the oil supplied by said pump, one of said tubes being connected to conduits adapted to carry oil to parts to be lubricated and being provided with a relief valve, and the other tube having a plurality of lateral apertures adapted to by-pass the oil, and a rod sliding in said last mentioned tube and adapted to close said apertures.

3. In a device of the class described, a downwardly extending drive shaft, a casing enclosing said shaft and spaced therefrom, means at the lower end of said shaft driven thereby for pumping oil into said casing, a bypass associated directly with said pumping means, an emergency relief valve associated with said casing, leads from said casing for delivering lubricant to an engine, a plunger controlling said bypass and a connection between the throttle of the engine and the plunger.

In testimony whereof we have hereunto set our hands.

JOSEPH A. TARKINGTON.
HERMAN D. PALMER.